United States Patent
Jin (10) Patent No.: US 10,732,411 B2
(45) Date of Patent: Aug. 4, 2020

(54) METHODS AND DEVICES FOR PROCESSING MOTION-BASED IMAGE

(71) Applicant: Samsung Electronics Co., Ltd., Suwon-si, Gyeonggi-do (KR)

(72) Inventor: Seung-hun Jin, Hwaseong-si (KR)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 217 days.

(21) Appl. No.: 15/831,922

(22) Filed: Dec. 5, 2017

(65) Prior Publication Data

US 2018/0164586 A1    Jun. 14, 2018

(30) Foreign Application Priority Data

Dec. 12, 2016 (KR) ................. 10-2016-0168708

(51) Int. Cl.
*G06T 19/00* (2011.01)
*G02B 27/01* (2006.01)
*H04N 5/073* (2006.01)
*G06F 3/01* (2006.01)
*H04N 5/04* (2006.01)

(52) U.S. Cl.
CPC ....... *G02B 27/0103* (2013.01); *G02B 27/017* (2013.01); *H04N 5/0736* (2013.01); *G02B 2027/014* (2013.01); *G02B 2027/0145* (2013.01); *G06F 3/012* (2013.01); *G06T 19/003* (2013.01); *H04N 5/04* (2013.01)

(58) Field of Classification Search
CPC . G02B 27/0103; G02B 27/017; H04N 5/0736
USPC ........................................................ 345/530
See application file for complete search history.

(56) References Cited

U.S. PATENT DOCUMENTS

| | | | |
|---|---|---|---|
| 6,911,985 B1* | 6/2005 | Fujimoto | G06T 15/005 345/522 |
| 8,659,593 B2 | 2/2014 | Furukawa et al. | |
| 8,960,919 B2 | 2/2015 | Nishimura | |
| 9,129,394 B2 | 9/2015 | Ungureanu et al. | |
| 9,375,635 B2 | 6/2016 | Cotter | |
| 2013/0271474 A1 | 10/2013 | Apodaca | |
| 2013/0290461 A1 | 10/2013 | Balassanian et al. | |
| 2014/0029029 A1 | 1/2014 | Akuzawa | |
| 2014/0092150 A1* | 4/2014 | Slavenburg | G09G 5/001 345/698 |

(Continued)

FOREIGN PATENT DOCUMENTS

| | | |
|---|---|---|
| JP | 2009-032122 A | 2/2009 |
| KR | 2016-0034742 A | 3/2016 |

(Continued)

*Primary Examiner* — Jin Ge
(74) *Attorney, Agent, or Firm* — Harness, Dickey & Pierce, P.L.C.

(57) ABSTRACT

Disclosed are methods and devices for processing a motion-based image by determining a rendering time point that reflects a recent user motion. The methods include obtaining commands or data used in graphics rendering from a memory; determining a rendering time point of a first frame between continuous vertical synchronization signals based on an expected rendering time of the first frame; and rendering the motion-based image based on the commands or the data, and motion-related data corresponding to the rendering time point of the first frame.

16 Claims, 6 Drawing Sheets

(56) References Cited

U.S. PATENT DOCUMENTS

| | | |
|---|---|---|
| 2016/0155209 A1 | 6/2016 | Kim et al. |
| 2016/0188088 A1* | 6/2016 | Rodrigues De Araujo ................. G06F 3/0416 |
| | | 345/173 |
| 2017/0124965 A1* | 5/2017 | Verbeure .............. G09G 3/3614 |
| 2017/0221173 A1* | 8/2017 | Acharya ................... G06T 1/20 |
| 2018/0315364 A1* | 11/2018 | Yamamoto ............. G02B 27/02 |

FOREIGN PATENT DOCUMENTS

| | | |
|---|---|---|
| KR | 2016-0063648 A | 6/2016 |
| WO | WO-2012/077417 A1 | 6/2012 |

* cited by examiner

METHODS AND DEVICES FOR PROCESSING MOTION-BASED IMAGE

CROSS-REFERENCE TO RELATED APPLICATION

This application claims the benefit of Korean Patent Application No. 10-2016-0168708, filed on Dec. 12, 2016, in the Korean intellectual Property Office, the disclosure of which is incorporated herein in its entirety by reference.

BACKGROUND

1. Field

Some example embodiments relate to methods and devices for processing a motion-based image.

2. Description of the Related Art

In a virtual reality application, motion-to-photon latency, which is the time taken for a user to see a user motion-based image with his/her eyes, may have a negative influence on user experience. In particular, if user motion-related data input prior to rendering is applied to a frame, an increase in motion-to-photon latency may result and the quality of a virtual reality application may deteriorate.

SUMMARY

Some example embodiments provide methods and devices for processing a motion-based image by determining a rendering time point that reflects a recent user motion.

According to some example embodiments, there are provided methods of processing a motion-based image, the methods include obtaining commands or data used in graphics rendering from a memory. The methods further include determining a rendering time point of a first frame between continuous vertical synchronization signals based on an expected rendering time of the first frame. Furthermore, the methods include rendering the motion-based image based on the commands or the data, and motion-related data corresponding to the rendering time point of the first frame.

According to some example embodiments, there is provided a non-transitory computer-readable recording medium having recorded thereon a program for executing methods of processing a motion-based image.

According to some example embodiments, there are provided devices for processing a motion-based image, the devices include: a memory configured to store commands or data used in graphics rendering; and a graphics processing unit (GPU) communicatively coupled to the memory and configured to obtain the commands or the data from the memory. The GPU is further configured to determine a rendering time point of a first frame between continuous vertical synchronization signals based on an expected rendering time of the first frame. Furthermore, the GPU is configured to render the motion-based image based on the commands or the data, and motion-related data corresponding to the rendering time point of the first frame.

According to some example embodiments, there are provided devices for processing a motion-based image, the devices include: a memory storing computer-readable instructions; and graphics processing unit (GPU) communicatively coupled to the memory and configured to obtain first image data corresponding to a first frame. The GPU is further configured to estimate a first expected rendering time of the first frame based on a rendering amount of the first frame and an actual rendering time of a second frame, the second frame being previous to the first frame. The GPU is further configured to determine a first rendering time point for the first frame based on the first expected rendering time and a rendering target time point for the first frame. The GPU is further configured to determine first motion-related data generated by a user and corresponding to the first rendering time point. Furthermore, the GPU is configured to render a first motion-based image based on the first image data and the first motion-related data.

BRIEF DESCRIPTION OF THE DRAWINGS

Some example embodiments will be more clearly understood from the following detailed description taken in conjunction with the accompanying drawings in which.

DETAILED DESCRIPTION

Figure 1:
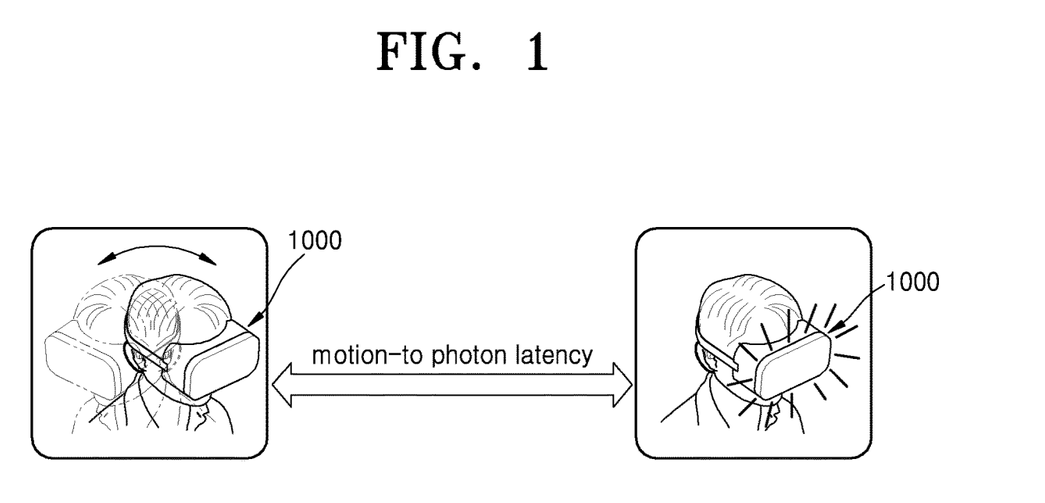
FIG. 1 is a diagram illustrating a virtual reality environment, according to some example embodiments.

FIG. 1 is a diagram illustrating a virtual reality environment, according to some example embodiments.

Referring to FIG. 1, a system 1000 providing a motion-based image is illustrated. As shown in FIG. 1, the system 1000 providing the motion-based image may be a head-mounted display (HMD). When a user wearing the system 1000 moves, the system 1000 may sense user motion information and provide a motion-based image reflecting the sensed user motion information.

A motion-to-photon latency exists between the time when motion information about a user is generated and the time when a motion-based image reflecting user motion information is provided to a user. As this delay is reduced, a sense of realism felt by a user may be improved. In other words, in the virtual reality environment, it may be important to reduce motion-to-photon latency because the motion-tophoton latency delays when a user sees a user motion-based image with his/her eyes, and thus may negatively influence user experience.

Figure 2:
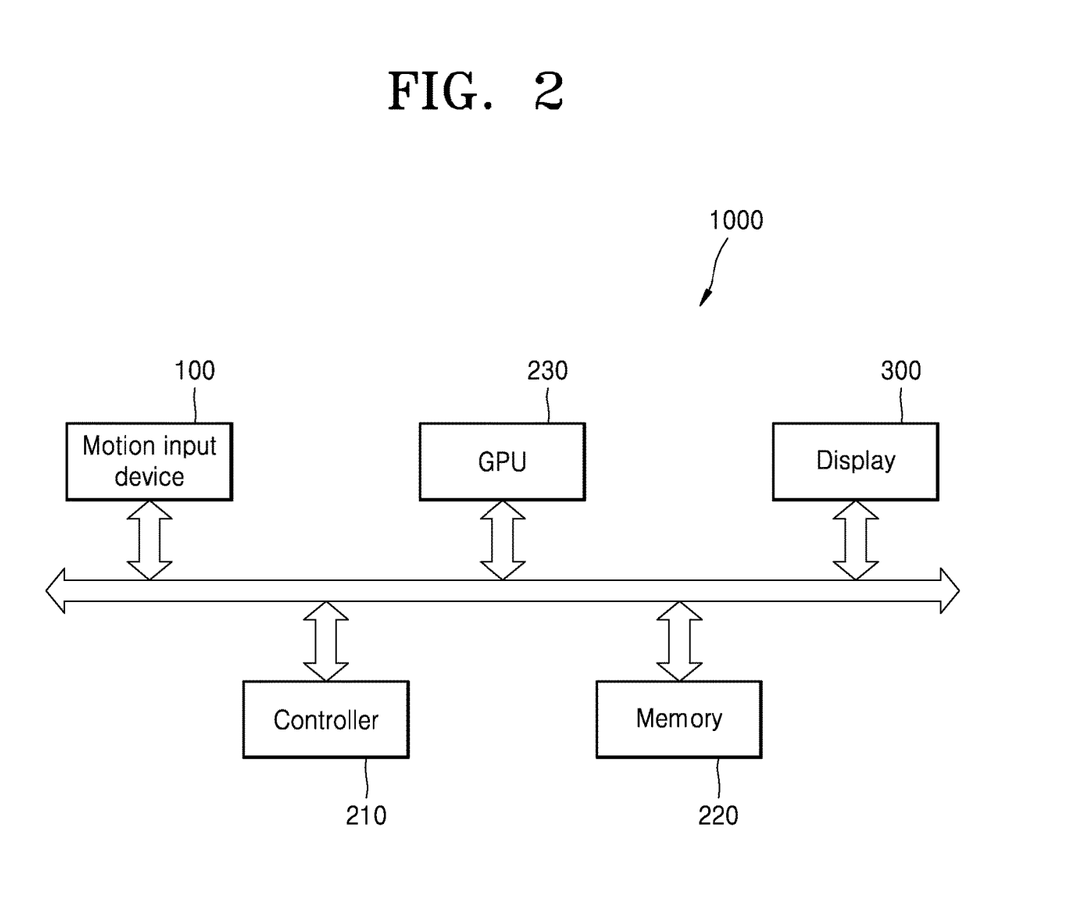
FIG. 2 is a block diagram illustrating components of a system providing a motion-based image, according to some example embodiments.

FIG. 2 is a block diagram illustrating components of a system providing a motion-based image (e.g., system 1000), according to some example embodiments.

Referring to FIG. 2, the system 1000 providing the motion-based image may include a motion input device 100, a controller 210, a memory 220, a graphics processing unit (GPU) 230, and a display 300.

The motion input device 100 may sense user motion information generated according to a user motion. The motion input device 100 may be one of various types of devices such as an HMD device, a wearable device, a handheld device, a smart phone, a tablet, an Internet of things device, etc. The motion input device 100 may sense the user motion information continuously or over a certain period to provide updated motion-related data through the system 1000. The motion input device 100 may include at least one sensor to track user motions. In some example embodiments, the at least one sensor may include an accelerometer and/or a gyroscope. However, these are only some example embodiments and one of ordinary skill in the art would understand that any sensor that detects and/or tracks user motion may be used.

The controller 210 may generally control the system 1000 providing the motion-based image. The controller 210 may configure an image processing device along with the memory 220 and the GPU 230. According to at least some embodiments, operations described herein as being performed by the controller 210 may be performed by at least one processor executing program code that includes instructions corresponding to the operations. The instructions may be stored in a memory. In some example embodiments, the instructions may be stored in memory 220. The term 'processor', as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The memory 220 may store commands or data used for graphics rendering. The memory 220 may store various types of data. For example, the memory 220 may store frame data forming an image, motion-related data corresponding to the user motion information of the motion input device 100, etc. In some example embodiments, the memory may include a read only memory (ROM), programmable read only memory (PROM), electrically programmable ROM (EPROM), electrically erasable and programmable ROM (EEPROM), flash memory, random access memory (RAM), dynamic RAM (DRAM), static RAM (SRAM), and/or synchronous RAM (SDRAM). However, these are only some example embodiments and one of ordinary skill in the art would understand that any memory that stores computer-readable instructions may be used.

The GPU 230 may perform graphics rendering. The commands or the data used for graphics rendering may be stored in the memory 220. In some example embodiments, the commands or the data may include image data corresponding to a frame. The controller 210 may call the commands or the data from the memory 220 and transmit the commands or the data to the GPU 230. The GPU 230 may perform graphics rendering based on the received commands or data. The GPU 230 may apply the motion-related data with respect to each frame to render the motion-based image. According to some embodiments, operations described herein as being performed by the GPU 230 may be performed by at least one processor executing program code that includes instructions corresponding to the operations. The instructions may be stored in a memory. In some example embodiments, the instructions may be stored in memory 220.

The display 300 may display the motion-based image that is completely rendered by the GPU 230 for viewing by a user. In some example embodiments, the screen may include a liquid crystal display (LCD), an organic light emitting diode (OLED) display, active matrix OLED (AMOLED) and/or a touchscreen display. However, these are only some example embodiments and one of ordinary skill in the art would understand that any display capable of depicting rendered images may be used.

Figure 3:
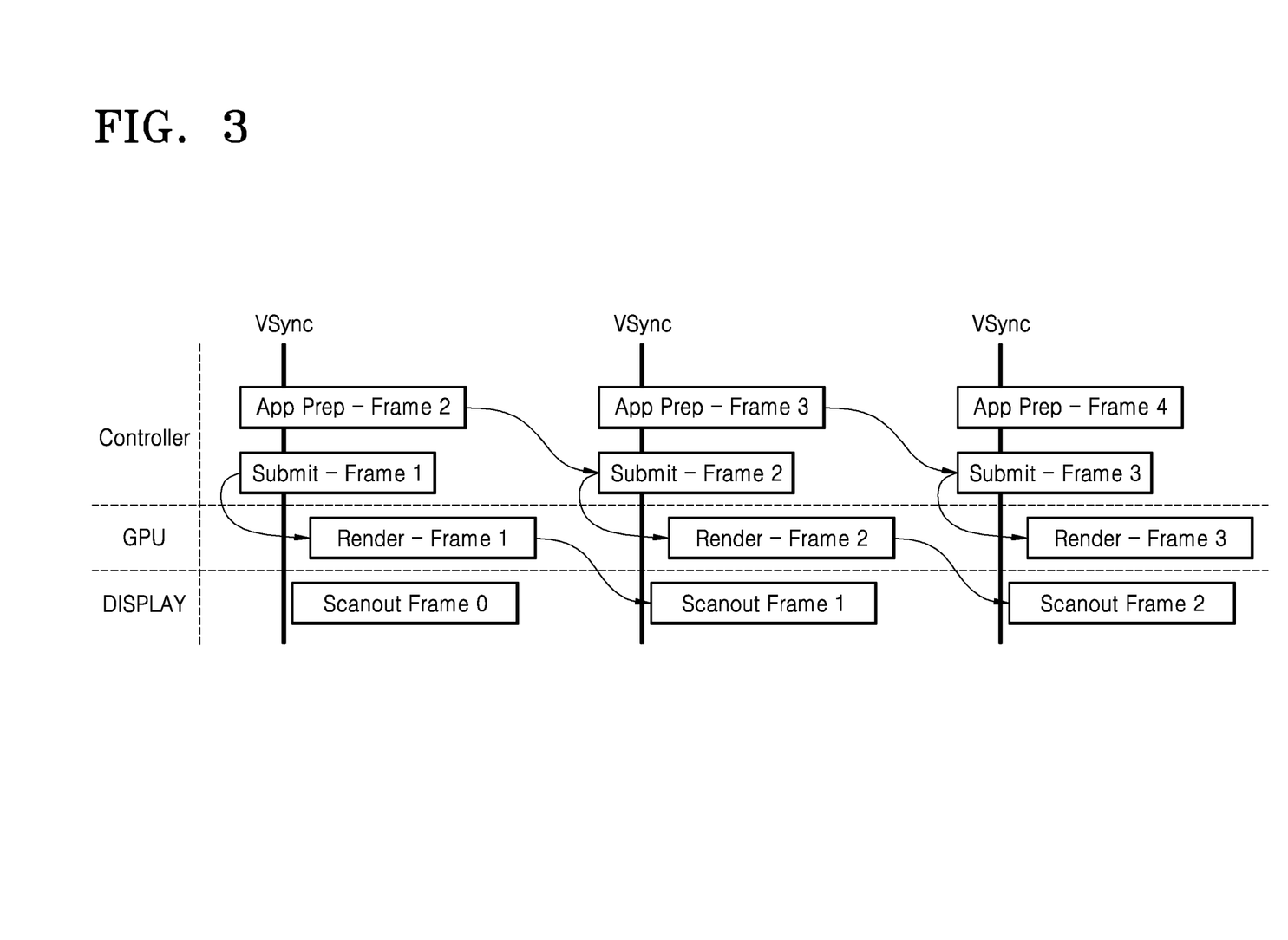
FIG. 3 is a diagram illustrating a rendering queue based on a vertical synchronization (sync) signal, according to some example embodiments.

FIG. 3 is a diagram illustrating a rendering queue based on a vertical synchronization (sync) signal Vsync, according to some example embodiments.

Referring to FIG. 3, a controller (e.g., the controller 210), a GPU (e.g., the GPU 230), and a display (e.g., the display 300) may sequentially process frames forming an image. The controller 210, the GPU 230 and the display 300 have been explained in further detail in association with FIG. 2 and will not be described further here for the sake of expediency. The controller, the GPU, and the display will be discussed in association with FIG. 3 using the numerals of FIG. 2; however, one of ordinary skill in the art would understand that these components are not limited by the description associated with FIG. 2 and that any controller, GPU and display may be used. The GPU 230 and the display 300 may perform jobs on the frames based on the vertical sync signal Vsync. In order to provide the GPU 230 with access to the vertical sync signal Vsync, GPU 230 may be connected to an integrated circuit (IC) included in the display 300. The controller 210 may perform a job irrespective of the vertical sync signal Vsync.

The frames forming the image may be prepared by the controller 210 and submitted to the GPU 230. For example, the controller 210 may submit a first frame to be currently processed to the GPU 230 and contemporaneously perform a preparation job on a second frame that is a posterior frame of the first frame. The controller 210 may prepare and submit frames of a next sequence to the GPU 230 in the same manner.

The GPU 230 may perform rendering on a rendering job target submitted by the controller 210. The GPU 230 may mark the rendering job target submitted by the controller 210 as ready and determine a rendering time point after a vertical sync signal closest to a time point of the rendering job target submitted by the controller 210. Each vertical sync signal is received at the GPU 230 at a specific receiving time.

When the GPU 230 has completed rendering a frame, the frame may be output on a screen by the display 300.

Referring to FIG. 3, when the controller 210 prepares a job on the second frame (referred to in FIG. 3 as "App Prep") and submits the second frame, the GPU 230 may determine a rendering time point of the second frame after a vertical sync signal closest to a time point of the second frame submitted by the controller 210, and perform rendering on the second frame. When rendering of the second frame is completed, the frame may be output by the display 300 on a screen after a next vertical sync signal (referred to in FIG. 3 as "Scanout"). That is, a time point at which the second frame is actually output on the screen in consideration of the vertical sync signal may be at least two frames after the controller 210 submits the second frame to the GPU 230.

The controller 210 may submit a rendering job target including a command to the GPU 230 as soon as the rendering job target is prepared. In this regard, if a time point when the controller 210 submits the rendering job target including the command is too late, a time point at which rendering is completed may pass a next vertical sync signal. In this case, a related frame may not be output on the screen. On the contrary, if the time point when the controller 210 submits the rendering job target including the command is too early, since the time point at which rendering is completed may be prior to the next vertical sync signal, the related frame may be output on the screen but may include invalid or old source data, which may cause an increase in motion-to-photon latency, that is, time taken for a user to see a user motion-based image with his/her eyes. Methods and devices for processing a motion-based image by determining a rendering time point in order to reflect a recent user motion, according to some example embodiments, will be described below.

Figure 4:
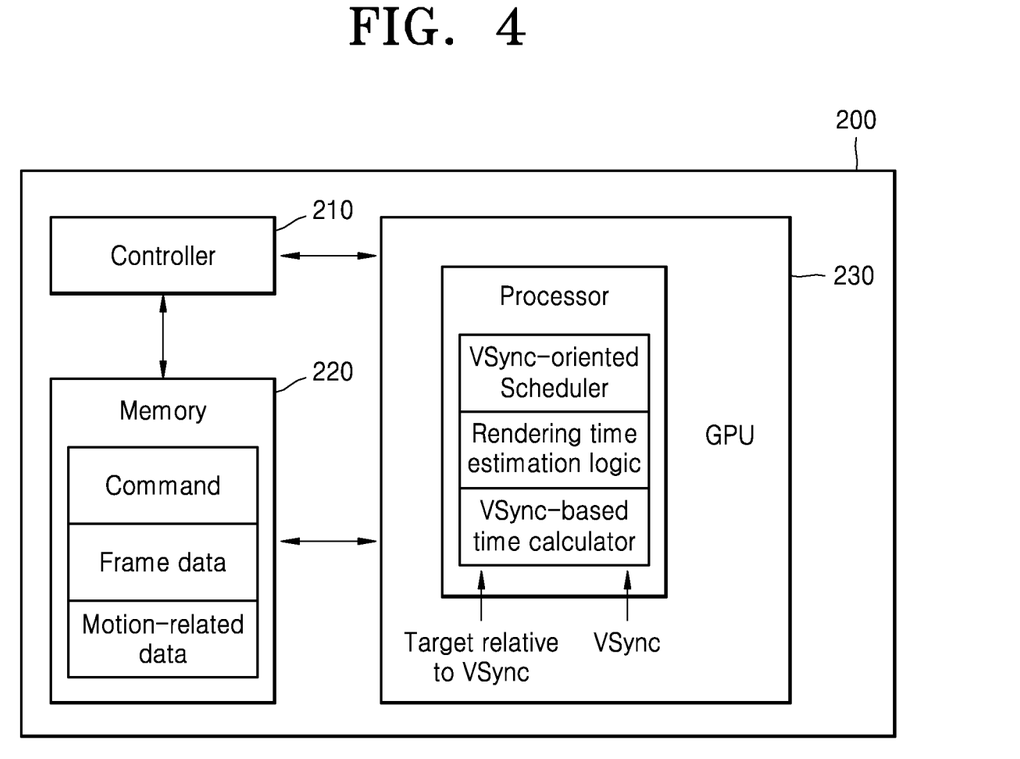
FIG. 4 is a block diagram illustrating components of a device for processing a motion-based image using an expected rendering time estimation logic included in a graphics processing unit (GPU) of the device, according to some example embodiments.

FIG. 4 is a block diagram illustrating components of a device 200 for processing a motion-based image using an expected rendering time estimation logic included in a GPU 230 of the device 200, according to some example embodiments.

The device 200 for processing the motion-based image may include a controller (e.g., the controller 210), a memory (e.g., the memory 220), and a GPU (e.g., the GPU 230). The device 200 for processing the motion-based image may correspond to a part of the system 1000 providing the motion-based image. The controller 210, the memory 220 and the GPU 230 have been explained in further detail in association with FIG. 2 and will not be described further here for the sake of expediency. The controller, the memory and the GPU will be discussed in association with FIG. 4 using the numerals of FIG. 2; however, one of ordinary skill in the art would understand that these components are not limited by the description associated with FIG. 2 and that any controller, memory and GPU may be used.

The memory 220 may store commands or data used in graphics rendering. The memory 220 may store frame data for forming an image, motion-related data that may indicate user motion information, etc. The motion-related data may include a motion vector and/or a camera matrix. In this regard, updating of the motion-related data may be performed independently of rendering of the motion-based image.

The controller 210 may call commands or data from the memory 220 and transmit the commands or the data to the GPU 230. The controller 210 may transmit the commands or the data irrespective of the vertical sync signal Vsync.

The GPU 230 may determine a rendering time point of each frame between continuous vertical sync signals based on an expected rendering time of each frame and render the motion-based image based on the commands or the data, and the motion-related data corresponding to the determined rendering time point of each frame. The GPU 230 may determine the rendering time point based on continuous vertical sync signals after the controller 210 transmits the commands or the data. This will be described in detail with reference to FIG. 5 below.

Figure 5:
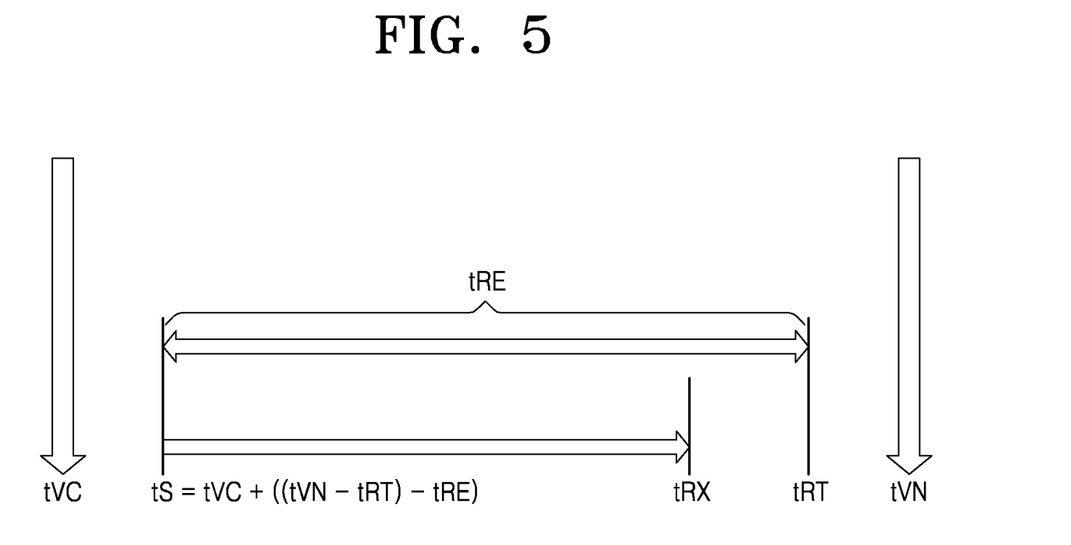
FIG. 5 is a diagram illustrating methods of calculating a rendering time point with respect to one frame based on two vertical sync signals, according to some example embodiments.

FIG. 5 is a diagram illustrating methods of calculating a rendering time point with respect to one frame based on two vertical sync signals, according to some example embodiments. In some example embodiments, the methods may be performed using the device 200 of FIG. 4. The controller, the memory and the GPU will be discussed in association with FIG. 5 using the numerals of FIG. 4; however, one of ordinary skill in the art would understand that these components are not limited by the description associated with FIG. 4 and that any controller, memory and GPU may be used.

Referring to FIG. 5, a current vertical sync signal tVC and a next vertical sync signal tVN may be present as continuous vertical sync signals, and a rendering time point with respect to a current frame may be determined between the current vertical sync signal tVC, and the next vertical sync signal tVN.

The GPU 230 may determine a time point as a rendering time point tS with respect to each frame by inverse calculation using an expected rendering time tRE and a rendering target time point tRT of a frame. As a result, the rendering time point tS may be determined as "tS=tVC+((tVN−tRT)−tRE)" as shown in FIG. 5.

The GPU 230 may obtain the rendering target time point tRT of the frame from the controller 210. The rendering target time point tRT of the frame may be a target time point at which rendering is completely performed on a current frame between continuous vertical sync signals and may be set with respect to the next vertical sync signal tVN. For example, the rendering target time point tRT of the frame may be 1 millisecond (ms) prior to the next vertical sync signal tVN.

Figure 6:
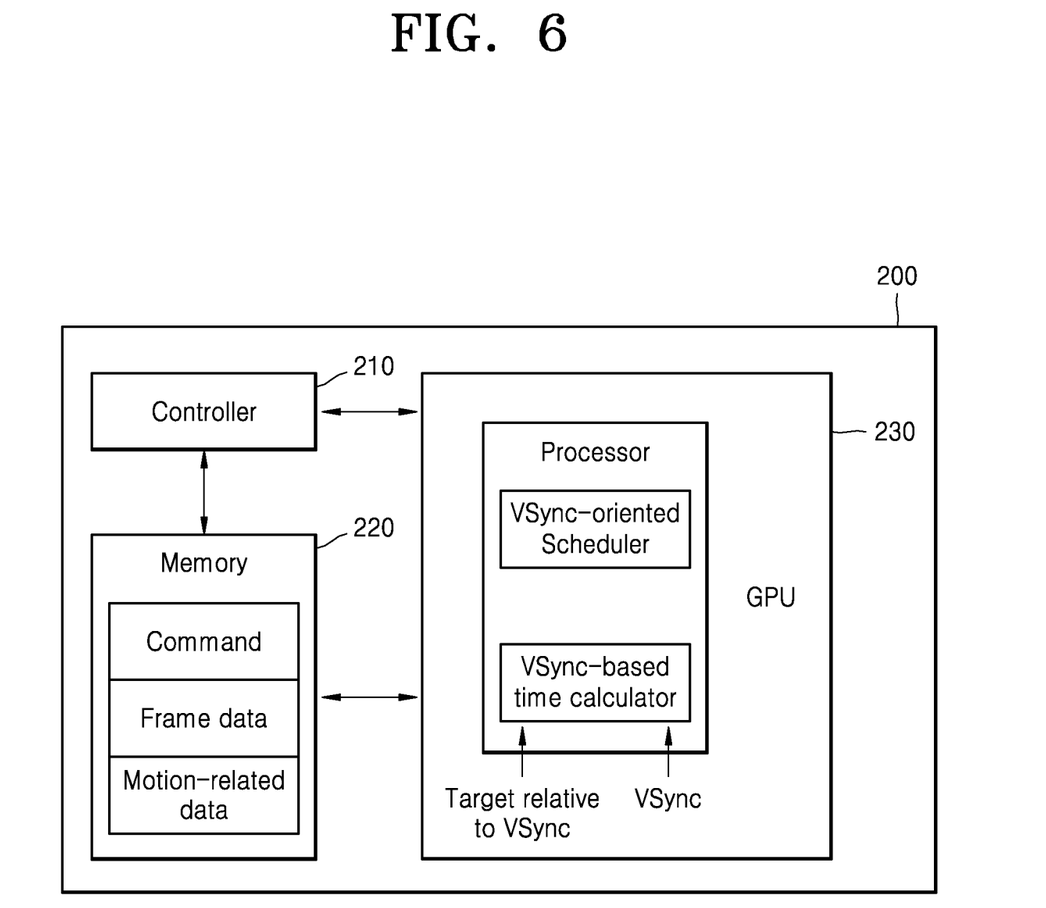
FIG. 6 is a block diagram illustrating components of a device for processing a motion-based image using an expected rendering time estimation logic included in a controller of the device, according to some example embodiments.

The expected rendering time tRE may be estimated by the controller 10 or the GPU 230. In FIG. 4, the GPU 230 estimates the expected rendering time tRE, according to some example embodiments. In FIG. 6, the controller 210 estimates the expected rendering time tRE, according to some example embodiments.

Referring to FIG. 4, the GPU 230 may include at least one processor including a plurality of processing modules such as a vertical sync signal-based time calculator, an expected rendering time estimation logic, a vertical sync signal-oriented scheduler, etc. Any of all of the components of the at least one processor (e.g., the vertical sync signal-based time calculator, the expected rendering time estimation logic, the vertical sync signal-oriented scheduler, etc.) may be a hardware block including an analog circuit and/or a digital circuit, and may be a software block including a plurality of instructions that are executed by a processor or the like. Operations described herein as being performed by any or all of the vertical sync signal-based time calculator, the expected rendering time estimation logic, the vertical sync signal-oriented scheduler, etc. may be performed by at the least one processor executing program code that includes instructions stored in a memory corresponding to the operations.

The vertical sync signal-based time calculator of the GPU 230 may determine the rendering target time point tRT and receive a vertical sync signal supplied from outside.

The expected rendering time estimation logic of the GPU 230 may estimate the expected rendering time tRE of the frame based on a rendering amount of the frame and an actual rendering time of a previous frame with respect to each frame. Specifically, the GPU 230 may estimate the expected rendering time tRE of the frame with respect to the rendering amount of the frame, corresponding to the actual rendering time tRX of the previous frame with respect to the rendering amount of the previous frame. For example, when the rendering amount of the frame is twice the rendering amount of the previous frame, the GPU 230 may estimate the expected rendering time tRE, of the frame to be twice the actual rendering time of the previous frame. The rendering amount of the frame may be determined according to the number of draw calls with respect to the frame, the number of primitives included in the draw calls, the size of the frame, the number of buffers used in the frame, and the like.

The vertical sync signal-oriented scheduler of the GPU 230 may determine the rendering time point tS with respect to each frame based on continuous vertical sync signals, the rendering target time point tRT, and the expected rendering time tRE.

FIG. 6 is a block diagram illustrating components of the device 200 for processing a motion-based image using an expected rendering time estimation logic included in the controller 210 of the device 200, according to some example embodiments.

In some example embodiments, the device 200 of FIG. 6 includes a similar or the same controller 210, memory 220 and GPU 230 to the device 200 of FIG. 4. Redundant descriptions between FIGS. 4 and 6 will be omitted below.

Referring to FIG. 6, the device 200 includes at least one processor for processing the motion-based image that may include a plurality of processing modules, such as a vertical sync signal-based time calculator, a vertical sync signal-oriented scheduler, etc. Any of all of the components of the at least one processor (e.g., the vertical sync signal-based time calculator, the vertical sync signal-oriented scheduler, etc.) may be a hardware block including an analog circuit and/or a digital circuit, and may be a software block including a plurality of instructions that are executed by a processor or the like. Operations described herein as being performed by any or all of the vertical sync signal-based time calculator, the vertical sync signal-oriented scheduler, etc. may be performed by at the least one processor executing program code that includes instructions stored in a memory corresponding to the operations.

Unlike FIG. 4, an expected rendering time estimation logic is excluded in FIG. 6. Instead, the controller 210 outside the GPU 230 may act as the expected rendering time estimation logic in FIG. 6. That is, the GPU 230 may transmit an actual rendering time with respect to a previous frame on which rendering is completely performed to the controller 210. The controller 210 may estimate an expected rendering time of a frame based on a rendering amount of the frame and the actual rendering time with respect to each frame, and transmit the estimated expected rendering time of the frame to the GPU 230. In some example embodiments, the expected rendering time estimation logic is a processing module included in the controller 210. The expected rendering time estimation logic may be a hardware block including an analog circuit and/or a digital circuit, and may be a software block including a plurality of instructions that are executed by a processor or the like. Operations described herein as being performed by the expected rendering time estimation logic may be performed by at the least one processor executing program code that includes instructions stored in a memory corresponding to the operations.

The vertical sync signal-based time calculator of the GPU 230 may determine the rendering target time point tRT and receive a vertical sync signal supplied from outside.

The vertical sync signal-oriented scheduler of the GPU 230 may determine the rendering time point tS with respect to each frame based on continuous vertical sync signals, the rendering target time point tRT, and the expected rendering time tRE estimated by the controller 210.

In FIGS. 4 and 6, the controller 210 operating irrespective of the vertical sync signal Vsync may be independent from the GPI 230 operating based on the vertical sync signal Vsync. The GPU 230 may include at least one processor, for example, separate processors with respect to functions thereof, or an integrated processor with respect to two or more functions thereof.

Figure 7:
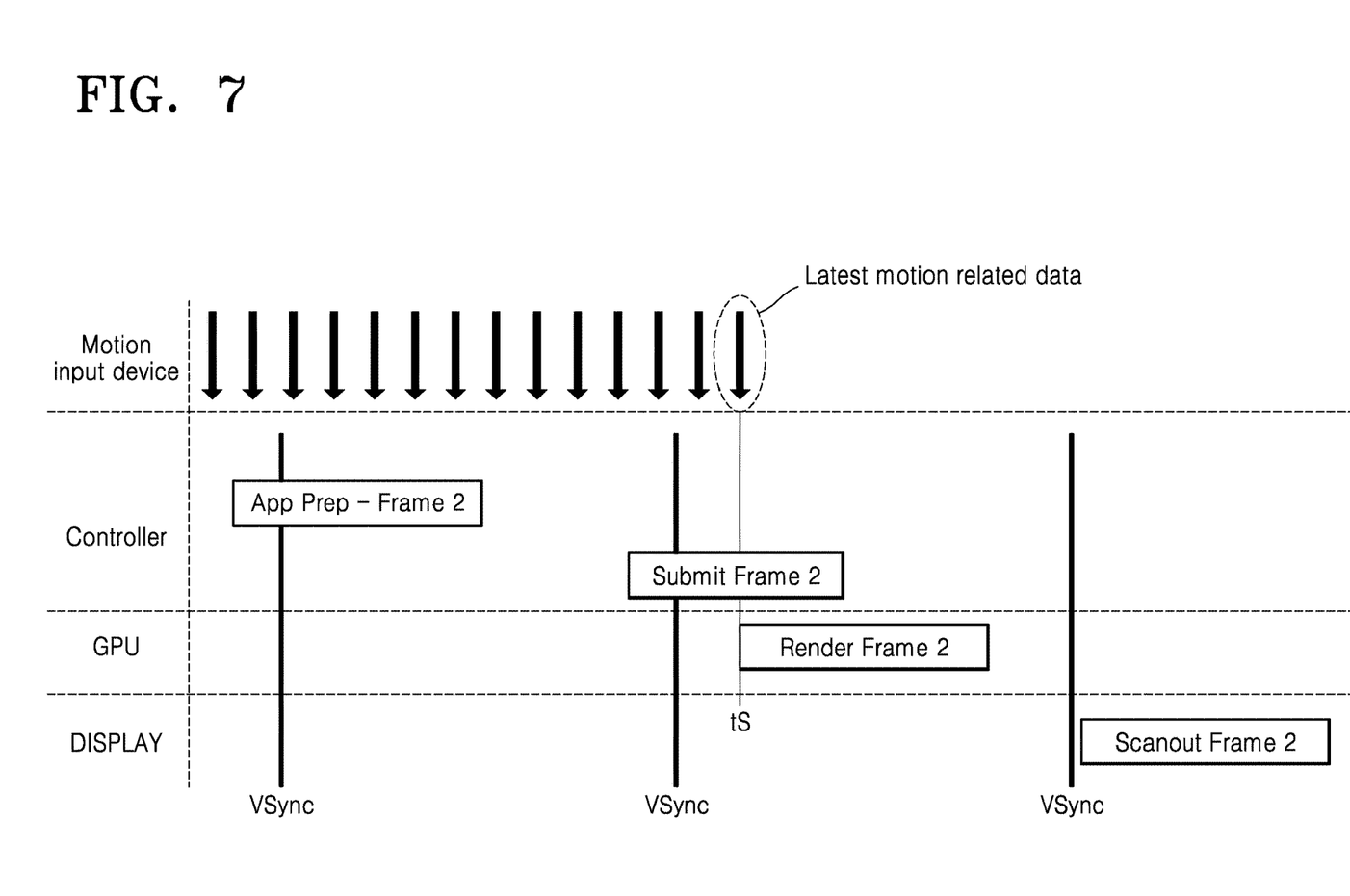
FIG. 7 is a diagram illustrating operations for rendering of one frame by reflecting motion information at a determined rendering time point, according to some example embodiments.

FIG. 7 is a diagram illustrating operations for rendering of one frame by reflecting motion information at a determined rendering time point, according to some example embodiments. In some example embodiments, the operations may be performed using the device 200 of FIGS. 4 and/or 6. The device 200 for processing the motion-based image may correspond to a part of the system 1000 providing the motion-based image as described in association with FIG. 2. In some example embodiments, the display 300 of system 1000 may be connectively coupled with the components of the device 200 and operated as a component of the device 200. The controller, the GPU and the display will be discussed in association with FIG. 7 using the numerals of FIGS. 2, 4 and/or 6, however, one of ordinary skill in the art would understand that these components are not limited by the description associated with FIG. 2, 4 or 6 and that any controller, GPU and display may be used. The operations of FIG. 7 are performed within the context of the rendering queue of FIG. 3. Redundant descriptions between FIGS. 3 and 7 will be omitted below.

Referring to FIG. 7, a second frame among a plurality of frames forming an image may be sequentially processed by the controller 210, the GPU 230, and the display 300. The GPU 230 may determine the rendering time point tS of the second frame between continuous vertical sync signals based on an expected rendering time of the second frame. The GPU 230 may render a motion-based image based on motion-related data corresponding to the determined rendering time point tS of the second frame.

In this regard, a rendering time point of each frame determined by the GPU 230 may be an upper limit latency time point at which normal rendering is completely performed on each frame between continuous vertical sync signals. The GPU 230 may render the motion-based image based on latest motion-related data corresponding to the upper limit latency time point among renewed motion-related data.

When user motion-related data input at a time point prior to a rendering time point is applied, an increase in motion-to-photon latency may occur corresponding to the time taken for a user to see a user motion-based image with his/her eyes, which may deteriorate realism. However, according to some example embodiments, the rendering time point of each frame may be determined as an upper limit latency time point within a range in which normal rendering is completely performed on each frame, and the latest motion-related data may be applied. Thus, a latest user motion may be reflected in the motion-based image, thereby increasing realism.

Figure 8:
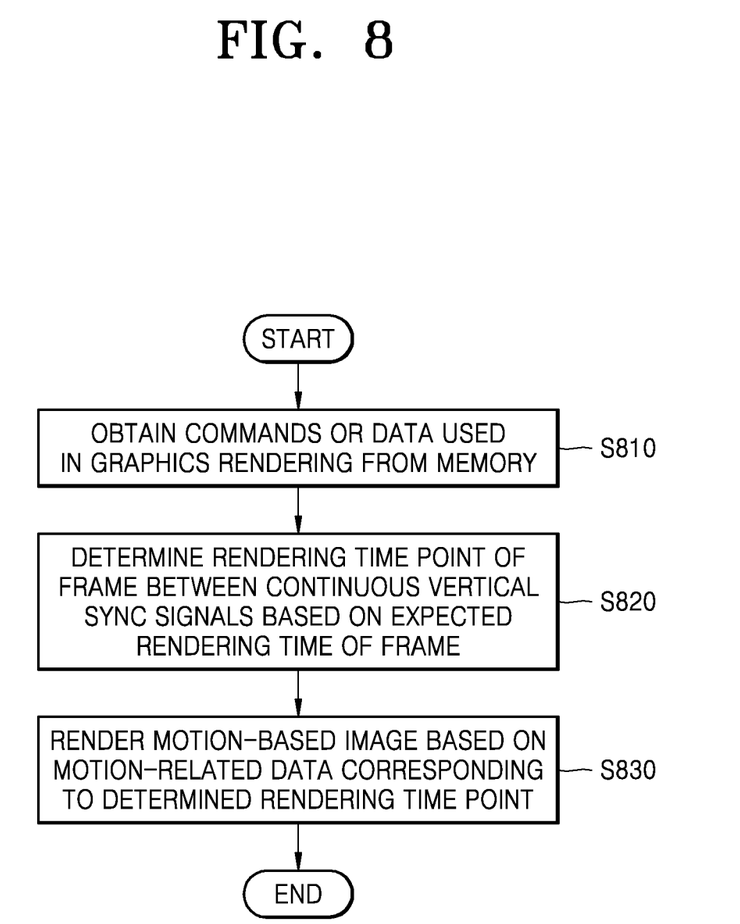
FIG. 8 is a flowchart illustrating methods of processing a motion-based image, according to some example embodiments.

FIG. 8 is a flowchart illustrating methods of processing a motion-based image, according to some example embodiments. In some example embodiments, the methods may be performed using the device 200 of FIGS. 4 and/or 6. The device 200 for processing the motion-based image may correspond to a part of the system 1000 providing the motion-based image as described in association with FIG. 2. In some example embodiments, the motion input device 100 of system 1000 may be connectively coupled with the components of the device 200 and operated as a component of the device 200. The controller, the GPU and the memory will be discussed in association with FIG. 8 using the numerals of FIGS. 2, 4 and/or 6, however, one of ordinary skill in the art would understand that these components are not limited by the description associated with FIG. 2, 4 or 6 and that any controller, GPU and memory may be used.

In operation S810, the controller 210 of the device 200 for processing a motion-based image may obtain commands or data used in graphics rendering from the memory 220 storing the commands or the data. In this regard, the controller 210 may obtain the commands or the data irrespective of a vertical sync signal.

In operation S820, the GPU 230 of the device 200 may determine a rendering time point of each frame between continuous vertical sync signals based on an expected rendering time of each frame. The GPU 230 may determine a rendering time point of each frame by inverse calculation using an expected rendering time of a frame and a rendering target time point of the frame.

The GPU 230 may estimate an expected rendering time of a frame based on a rendering amount of the frame and an actual rendering time with respect to each frame, and determine a rendering time point of each frame between continuous vertical sync signals based on the estimated expected rendering time of the frame.

Alternatively, the GPU 230 may transmit an actual rendering time with respect to a previous frame on which rendering is completely performed to the controller 210 outside the GPU 230 performing rendering. The GPU 230 may then receive an estimated expected rendering time of a frame from the controller 210 with respect to each frame based on a rendering amount of the frame and the actual rendering time with respect to the previous frame. Then the GPU 230 may determine a rendering time point of each frame between continuous vertical sync signals based on the received expected rendering time of each frame.

The GPU 230 may determine a rendering time point based on continuous vertical sync signals after a time point at which commands or data are obtained.

In operation S830, the GPU 230 may render the motion-based image based on the commands or the data, and motion-related data corresponding to the determined rendering time point of each frame. The motion-related data may include a motion vector and/or a camera matrix.

In this regard, the determined rendering time point of each determined frame may be an upper limit latency time point at which normal rendering is completely performed on each frame between continuous vertical sync signals. The GPU 230 may render the motion-based image based on latest motion-related data corresponding to the upper limit latency time point among renewed motion-related data.

The methods of processing the motion-based image may further include an operation of updating the motion-related data transmitted from the motion input device 100. The operation of updating the motion-related data may be performed independently of the operation of rendering the motion-based image.

The methods of processing the motion-based image described above may be implemented as an executable program, and may be executed by a general-purpose digital computer that runs the program by using a computer-readable recording medium. Examples of the non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer may execute the instructions.

While some example embodiments have been particularly shown and described, it will be understood that various changes in form and details may be made therein without departing from the spirit and scope of the following claims.

What is claimed is:

1. A method of processing a motion-based image, the method comprising:
    determining a rendering time point of a first frame between continuous vertical synchronization signals based on an expected rendering time of the first frame; and
    rendering the motion-based image based on motion-related data corresponding to the rendering time point of the first frame,
    wherein the determining includes determining a time point as the rendering time point with respect to the first frame by inverse calculation using the expected rendering time of the first frame and a rendering target time point of the first frame.

2. The method of claim 1, wherein the determining comprises:
    estimating the expected rendering time of the first frame based on a rendering amount of the first frame and an actual rendering time of a second frame, the second frame being ordered previous to the first frame; and
    determining the rendering time point with respect to the first frame between the continuous vertical synchronization signals based on the estimating.

3. The method of claim 1, wherein the determining comprises:
    transmitting an actual rendering time with respect to a second frame on which rendering is completely performed to a controller, the second frame being ordered previous to the first frame;
    receiving an estimation of the expected rendering time of the first frame based on a rendering amount of the first frame and the actual rendering time with respect to the second frame from the controller; and
    determining the rendering time point of the first frame between the continuous vertical synchronization signals based on the receiving.

4. The method of claim 1, wherein the rendering time point of the first frame is an upper limit latency time point at which normal rendering is completely performed on the first frame between the continuous vertical synchronization signals.

5. The method of claim 4, wherein the rendering comprises:
    rendering the motion-based image based on latest motion-related data corresponding to the upper limit latency time point among updated motion-related data.

6. The method of claim 1, further comprising:
    obtaining commands or data used in graphics rendering from a memory,
    wherein the obtaining comprises obtaining the commands or the data irrespective of a vertical synchronization signal, and the determining includes determining the rendering time point based on the continuous vertical synchronization signals after a time point at which the commands or the data are obtained.

7. A non-transitory computer-readable recording medium having recorded thereon a program which when executed by a processor, causes the processor to perform the method of claim 1.

8. A device for processing a motion-based image, the device comprising:
a memory configured to store commands or data used in graphics rendering; and
a graphics processing unit (GPU) communicatively coupled to the memory and configured to,
determine a rendering time point of a first frame between continuous vertical synchronization signals based on an expected rendering time of the first frame;
render the motion-based image based on motion-related data corresponding to the rendering time point of the first frame; and
determine a time point as the rendering time point with respect to the first frame by inverse calculation using the expected rendering time of the first frame and a rendering target time point of the first frame.

9. The device of claim 8, wherein the GPU is further configured to,
estimate the expected rendering time of the first frame based on a rendering amount of the first frame and an actual rendering time of a second frame, the second frame being ordered previous to the first frame.

10. The device of claim 8, wherein the device further comprises:
a controller communicatively coupled to the memory and the GPU;
the GPU is further configured to,
transmit an actual rendering time with respect to a second frame on which rendering is completely performed to the controller, the second frame being ordered previous to the first frame; and
the controller is configured to,
estimate the expected rendering time of the first frame based on a rendering amount of the first frame, and the actual rendering time with respect to the second frame; and
transmit the estimated expected rendering time to the GPU.

11. The device of claim 8, wherein the rendering time point of the first frame is an upper limit latency time point at which normal rendering is completely performed on the first frame between the continuous vertical synchronization signals.

12. The device of claim 11, wherein the GPU is further configured to,
render the motion-based image based on latest motion-related data corresponding to the upper limit latency time point among updated motion-related data.

13. The device of claim 8, wherein the device further comprises:
a controller communicatively coupled to the memory and the GPU, and configured to,
obtain the commands or the data from the memory; and
transmit the commands or the data to the GPU irrespective of a vertical synchronization signal; and
the GPU being further configured to,
obtain the commands or the data from the memory via the controller; and
determine the rendering time point based on the continuous vertical synchronization signals after a time point at which the controller transmits the commands or the data.

14. A device, comprising:
a memory storing first image data and second image data; and
a graphics processing unit (GPU) coupled to the memory and configured to,
obtain first image data corresponding to a first frame from the memory;
estimate a first expected rendering time of the first frame based on a rendering amount of the first frame and an actual rendering time of a second frame, the second frame being previous to the first frame;
determine a first rendering time point for the first frame based on the first expected rendering time and a rendering target time point for the first frame;
determine first motion-related data generated by a user and corresponding to the first rendering time point;
render a first motion-based image based on the first image data and the first motion-related data;
determine the first rendering time point based on a first vertical synchronization signal of a plurality of continuous vertical synchronization signals and a second vertical synchronization signal of the plurality of continuous vertical synchronization signals, the first vertical synchronization signal being previous to the second vertical synchronization signal;
receive the second vertical synchronization signal;
output the first motion-based image to a screen based on receiving the second vertical synchronization signal;
obtain the first image data at a first receiving time point based on receiving the first image data from a controller without consideration of any vertical synchronization signal of the plurality of continuous vertical synchronization signals; and
determining a vertical synchronization signal of the plurality of continuous vertical synchronization signals having a receiving time that is closest to the first receiving time point to be the first vertical synchronization signal.

15. The device of claim 14, wherein the GPU is further configured to,
obtain second image data corresponding to a third frame from the memory;
estimate a second expected rendering time of the third frame based on a rendering amount of the third frame and an actual rendering time of the first frame, the first frame being previous to the third frame;
determine a second rendering time point for the third frame based on the second expected rendering time and a rendering target time point for the third frame;
determine second motion-related data generated by the user and corresponding to the second rendering time point; and
render a second motion-based image based on the second image data and the second motion-related data.

16. The device of claim 14, wherein the GPU is further configured to,
receive continuously updated motion-related data; and
determine the first motion-related data from among the continuously updated motion-related data, the continuously updated motion-related data including a motion vector or a camera matrix.

* * * * *